ELECTRONIC SIGNAL PROCESSING APPARATUS

Filed July 27, 1967

3 Sheets-Sheet 1

INVENTOR.
BERT H. DANN
BY
ATTORNEY.

ELECTRONIC SIGNAL PROCESSING APPARATUS

Filed July 27, 1967 3 Sheets-Sheet 2

INVENTOR.
BERT H. DANN
BY [signature]
ATTORNEY.

INVENTOR.
BERT H. DANN

BY

ATTORNEY.

United States Patent Office 3,512,008
Patented May 12, 1970

3,512,008

ELECTRONIC SIGNAL PROCESSING APPARATUS

Bert H. Dann, Altadena, Calif., assignor to Bell & Howell Company, Chicago, Ill., a corporation of Illinois Filed July 27, 1967, Ser. No. 656,578
Int. Cl. H03k *17/00;* H03d *1/18*
U.S. Cl. 307—254 38 Claims

ABSTRACT OF THE DISCLOSURE

Apparatus for gating electric signals, either with or without amplification, modulation or demodulation, having singly or in combination (a) a switching stage which provides substitute output signals for the apparatus during intervals between gating operations;
(b) at least two interconnected signal processing stages constructed to be gated on and off by control signals applied to a point between the interconnected processing stages;
(c) switching and signal processing stages with common output circuits promoting the suppression of switching transients.

CROSS-REFERENCE TO RELATED APPLICATION

The application Ser. No. 656,573, entitled "Electronic Signal Processing Systems," and filed of even date herewith by Bert H. Dann and Norton W. Bell, is related to the subject application.

BACKGROUND OF THE INVENTION

The present invention relates to electric signal processing apparatus and more particularly to electronic switching or gating apparatus and switched or gated modulators and demodulators.

DESCRIPTION OF THE PRIOR ART

In many electronic applications it is necessary to switch or gate electric signals, either with or without amplification, or to switch or gate modulation or demodulation processes with high reliability and minimum signal distortion. Despite the multitude of circuits designed or proposed for these purposes, there still exists a need for improved apparatus in this area.

For example, there exists a need for an apparatus which gates electric signals, with or without amplification, modulation or demodulation, and which provides during gating intervals a stable signal in substitution of the gated signal. This need is particularly felt in connection with the switching of electric video signals which are composed of video information and of synchronization information. When signals of this type are gated, it is very important that no spurious signal excursions occur that would undesirably actuate video synchronization circuits.

This can be prevented by the provision of a stable substitute signal during signal blocking intervals. In video applications, the substitute signal may be at what is known as "blanking level," which is a signal level that neither causes operation of the video portrayal apparatus nor of the synchronization equipment.

There also exists a need for switching or gating apparatus in which undesirable switching transients can be eliminated or at least reduced to practically tolerable levels. In the gating of video signals, for example, it is very important that no switching transients occur that could adversely affect the video image portrayal or the synchronization process.

SUMMARY OF THE INVENTION

From one aspect thereof, the invention provides apparatus for processing and switching electric signals comprising means for processing electric signals, and switching means including a switching circuit connected to said processing means for selectively suspending the processing of the electric signals.

According to this aspect of the invention, the switching means further include an output circuit for providing, when the processing of the mentioned electric signals is suspended, a substitute signal for the signals processed by the named processing means.

In this manner, the initially mentioned substitute signal is produced by circuit components, namely the switching means, which already participate in other phases of the operation of the apparatus. This eliminates the need for special signal-providing apparatus or components in addition to the basic switching or gating components and results in significantly improved performance, simplified operation and increased economy. The switching means thus perform the double function of gating or switching control and substitute signal provision.

The provision of a substitute signal assures the existence of a defined signal level during the periods in which the processing of signals by the signal processing means is suspended. In this manner, the output of the apparatus during these periods is not merely left to chance, to the detriment of the operation of the succeeding circuits or apparatus. In addition, this feature permits several signal processing apparatus to be operated in parallel without intolerable mutual interference due to fortuitous signal excursions. This is particularly important if different signal trains or signals in different channels are selectively switched for subsequent application to one circuit or apparatus.

From another aspect thereof, the invention provides apparatus for processing and switching electric signals, comprising at least two signal processing stages, means for interconnecting these processing stages, and switching means.

According to this aspect of the invention, the switching stages are constructed to selectively suspend the processing of the electric signals in response to switching signals applied to the named interconnecting means, and the switching means are connected to these interconnecting means for applying the switching signals just mentioned.

In this manner, the switching stages are controlled from a point between these stages. In accordance with the preferred embodiment, this point may be in the path of processed signals proceeding from one stage to the next.

As this description proceeds, it will be recognized that this feature permits a suppression of switching transients by the operation of the very components that effect the signal processing and switching or gating functions.

A very objectionable phenomenon is thus eliminated in highly efficient and reliable manner. This feature is of high utility not only when a single train is to be switched or gated, but also when, for instance, several apparatus according to the present aspect of the invention are employed in a parallel fashion to switch or gate different signal trains or signals in different channels. Particularly in the latter case, random switching transients, if not suppressed, tend to obscure extended portions of the switched signals.

A particularly advantageous apparatus is obtained if the two aspects of the invention described so far are combined to effect transient signal suppression and substitute signal provision and to realize thus apparatus in which these features interact for increased efficiency and improved performance.

From yet another aspect thereof, the subject invention provides apparatus for processing and switching electric signals, comprising means for processing electric signals, variable impedance means, and means for interconnecting these processing means and variable impedance means, and for receiving switching signals.

According to this aspect of the invention, the processing means are constructed to selectively suspend the processing of electric signals in response to the named switching signals, and the variable impedance means are adapted to vary their impedance in response to these switching signals, and the switching means are connected to the named interconnecting means for applying the mentioned switching signals.

As this description proceeds, it will be recognized that this aspect of the invention also permits a transient signal suppression, or a substitute signal provision, or a combination of these features.

The apparatus according to the various aspects of the invention may include a variety of further features, some of which may be summarized as follows:

(1) The apparatus may include means for applying a varying reference signal or a carrier signal to the named processing means to cause a demodulation of signals processed in the processing means, or to cause the processing means to provide a carrier signal modulated by signals processed in the processing means.

(2) The signal processing means include an output circuit at least part of which may be included in the output circuit of the switching means.

(3) The apparatus may include means, such as constant current source, for stabilizing the flow of electric current through a predetermined point of the interconnecting means between the signal processing stages or between the signal processing means and the above-mentioned variable impedance means.

The operation and utility of these features, as well as further embodiments, will become apparent as this description proceeds.

In general, it should be noted that while the processing of video signals is mentioned in here by way of example, the invention and its various aspects are in no way so limited. To the contrary, those skilled in the art will recognize that the apparatus of the subject invention lend themselves to numerous switching or gating operations or to switched or gated modulation or demodulation processes, as the case may be.

Moreover, the expression "signal" as used herein is not intended to signify electric signals in a narrow sense. Thus, the apparatus of the subject invention may, for example, process information-bearing electric signals, or electric currents or voltages which perform or give rise to control functions, or electric currents which have the purpose of conveying a form of energy.

DESCRIPTION OF THE DRAWINGS

The subject invention and various aspects thereof will become more readily apparent from the following detailed description of preferred embodiments, illustrated by way of example in the accompanying drawings in which.

DESCRIPTION OF PREFERRED EMBODIMENTS

Figure 1:
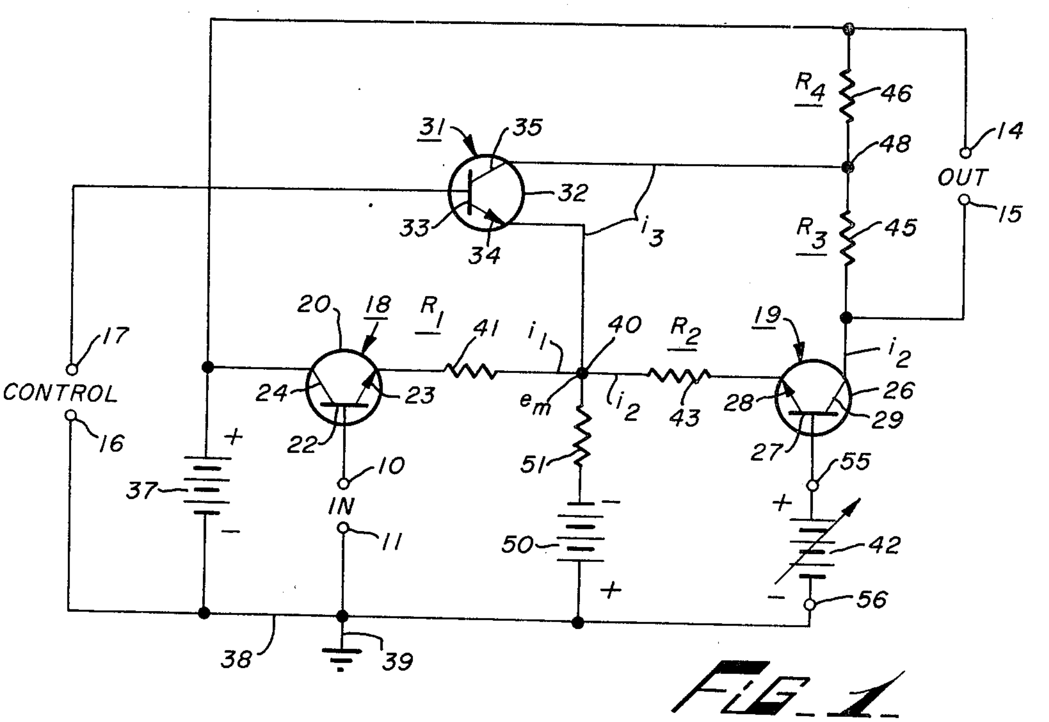
FIG. 1 is a diagram of a switching or gating apparatus in accordance with a preferred embodiment of the invention.

The circuit diagram of FIG. 1 is illustrative of an apparatus in accordance with a preferred embodiment of the subject invention which is capable of selectively gating electric signals.

The apparatus of FIG. 1 includes input terminal means 10 and 11 for receiving electric signals to be gated. This apparatus further includes signal output terminal means 14 and 15, and terminal means 16 and 17 for receiving a control or gating signal.

A first amplifier stage 18 and a second amplifier stage 19 constitute electronic signal processing means which are connected between the input terminal means 10 and 11 and the output terminal means 14 and 15. The first amplifier stage 18 includes a transistor 20 having a base electrode 22, an emitter electrode 23 and a collector electrode 24. The second amplifier stage 19 includes a transistor 26 having a base electrode 27, an emitter electrode 28 and a collector electrode 29.

The apparatus of FIG. 1 further includes electronic switching means 31 having a transistor 32 with a base electrode 33, an emitter electrode 34 and a collector electrode 35.

The transistors 20, 26 and 32 are shown herein as being of the NPN type. If the use of transistors of the PNP type is desired, the polarities of the various applied potentials are suitably changed in a manner well known to those skilled in the art.

The collector electrode 24 of the transistor 20 is connected to the positive terminal of an electric current source or battery 37. The negative terminal of battery 37 is connected to a common lead 38 which may be grounded as shown at 39.

The signal input terminal 10 is connected to the base electrode 22 of the transistor 20, and the signal input terminal 11 is connected to the above mentioned common lead 38. The emitter electrode 23 of the transistor 20 is connected to a terminal 40 through a resistor 41. As will be noted, the resistor 41 forms output impedance means for the stage 18.

The base electrode 27 of the transistor 26 is connected to the positive terminal of a source of variable bias potential 42. The negative terminal of source 42 is connected to the common lead 38. The emitter electrode 28 of the transistor 26 is connected to the above mentioned terminal 40 through a resistor 43. This resistor 43 forms input impedance means for the stage 19. The collector electrode 29 of the transistor 26 is interconnected with the positive terminal of the battery 37 through a pair of series-connected resistors 45 and 46. These resistors 45 and 46 are jointly connected to the above mentioned signal output terminals 14 and 15.

The control terminal 16 is connected to the common lead 38, while the control terminal 17 is connected to the base 33 of the transistor 32. The emitter electrode 34 of this transistor 32 is connected to the terminal 40, while the collector electrode 35 of this transistor is connected to the junction 48 between the above-mentioned resistors 45 and 46. In this manner, the resistor 46 forms an output impedance means for the switching stage 31, while the resistor 45, as well as the resistor 46 just mentioned, form output impedance means for the stage 19 or, considered broadly, for the signal processing means composed of the stages 18 and 19. The stages 18 and 19, and the switching stage 31 thus share an output impedance means, namely the resistor 46.

The positive terminal of a bias potential source 50 is connected to the common lead 38, while the negative terminal of this source is connected to the terminal 40 through a resistor 51.

A variable electric signal applied to the input terminals 10 and 11 is subjected to an amplification action by operation of the transistor 20 in the first amplifier stage 18. The amplified signal appears between terminal 40 and common lead 38 and is subjected to a further amplification action by operation of the transistor 26 in the second amplifier stage 19. The output signal of this signal processing operation appears across the resistors 45 and 46 and thus between the terminals 14 and 15. The voltage supplied by the variable source 42 to the transistor base 27 may be adjusted so that the signal between output terminals 14 and 15 has a predetermined value if the input signal between terminals 10 and 11 is at a predetermined level, such as zero or another predetermined reference level. The variable source 42 may be omitted and the transistor base 27 directly connected to the common lead 38 if the latter feature is not desired or necessary.

It is within the purview of FIG. 1 and subsequently described embodiments that the variable source 42 may be replaced by input terminals, shown as input terminals 55 and 56, for receiving electric signals to be processed by the illustrated apparatus. These terminals 55 and 56 then serve as a means for receiving electric signals, similar to the previously mentioned terminals 10 and 11.

In one mode of operation, the terminals 10 and 11 are interconnected. The transfer base electrode 22 is then connected to the common lead 38, and no external signals are applied to the terminals 10 and 11. Instead, the signals to be processed or switched are applied to the terminals 55 and 56, with the variable source 42 being omitted. In practical tests it has been found that the operations described herein can also be carried out in this mode of operation. This applies also to subsequently described embodiments.

In another mode of operation, the terminals 10 and 11 serve to receive first electric signals to be processed, and the terminals 55 and 56, with the variable source 42 omitted, serve to receive second electric signals to be processed. These first and second signals are combined during processing. It is thus for instance possible to perform adding functions on two signals or signal trains during the processing or switching thereof in the manner described above. Again, this applies also to subsequently described embodiments.

Accordingly, the phrase "input means for receiving electric signals" as used herein refers to input means in a broad sense. These may include the terminals 10 and 11 alone, or the terminals 55 and 56 alone, with the terminals 10 and 11 being shorted or the terminals 10 and 11 being omitted and the transistor base electrode 22 being connected to the common lead 38. The mentioned input means may alternatively include the terminals 10 and 11 for receiving first electric signals and the terminals 55 and 56, with the variable source 42 omitted, for receiving second electric signals.

The amplifier stages 18 and 19 are broadly classified as signal processing means, since an amplification in magnitude of the input signal is not of primary essence if it is merely desired to gate this signal between the input terminals 10 and 11 and the output terminals 14 and 15. In this instance, the gain provided by stages 18 and 19 may be small.

The action of the stages 18 and 19 is suspended by the application of a control signal to the control terminals 16 and 17. This signal, which may be a voltage pulse, is applied so that the base electrode 33 of transistor 32 is biased positively with respect to the common lead 38. This renders the transistor 32 operative so that a first output current flows through a circuit including the collector electrode 35 of the transistor 32 and the resistor 46 which is shared by the transistors 26 and 32 as an output resistor. Application of the control signal at the transistor base 33 also gives rise to an electric signal which occurs in a circuit including the emitter electrode 34 of transistor 32, the terminal 40, the resistor 51 and the source 50. This signal serves as a cut-off signal for the stages 18 and 19 in that it is of such a direction and magnitude that the operation of the transistors 20 and 26 is suspended thereby.

This may be expressed in a different manner by saying that the effect of the control signal at the transistor base 33 is such that current is diverted from the common terminal 40 to the transistor emitter 34 and insufficient current is available from the source 50 and the resistor 51 to maintain the transistors 20 and 26 in a conducting state. One could also classify this as an operation, in which the switching stage 31 varies a voltage level at the junction 40 so as to cut the transistors 20 and 26 off. The transistors 20 and 26 thus have a first state in which signals are processed from the input terminals 10 and 11 to the output terminals 14 and 15, and a second state in which the processing of these signals is suspended. The transistors 20 and 26 are switched from the first to the second state by action of the switching transistor 32, and revert back to the first state when the action of transistor 32 is terminated by a cessation of the control signal at terminals 16 and 17 or by a switching of this control signal to a value, such as a negative value, which switches the transistor 32 off.

The circuit shown in FIG. 1 has several advantageous features.

First, the switching stage 31 supplies through the collector electrode 35 and output resistor 46 a substitute signal which appears across terminals 14 and 15 during the times the stages 18 and 19 are cut off. As its name implies, this substitute signal appears in substitution of the otherwise present signal processed by the stages 18 and 19 as from the input terminals 10 and 11. The advantages of this substitute signal have been described above.

Secondly, while not limited in this manner, the circuit of FIG. 1 lends itself to integration in a monolithic or integrated circuit device, since it contains relatively few circuit elements and includes no capacitors or inductances which would be difficult to fabricate in monolithic form. Rather, the means for interconnecting the processing stages 18 and 19, namely the resistors 41 and 43, include only impedance means capable of conducting a direct current.

Thirdly, the subject circuit has been found to have a good inherent compensation against temperature fluctuations and component tolerance variations.

Fourthly, transient switching signals are suppressed to a large extent by the basic circuit components themselves, inasmuch as the transistors 26 and 32 partially share the output circuit provided by the resistors 45 and 46.

This suppression is particularly high if the ratio of the impedance value of the first processing stage 18 and the resistor 41 to the impedance value of the resistor 46 is substantially equal to the ratio of the impedance value of the second processing stage 19 and the resistor 43 to the impedance value of the resistor 45.

In this statement, the phrase "impedance value of the first processing stage 18 and the resistor 41" is broadly employed to denote (a) the impedance of resistor 41 plus (b) that impedance of transistor 20 which in operation appears in series to the impedance of resistor 41. The phrase "impedance value of the second processing stage 19 and the resistor 43" is broadly employed to denote (a) the impedance of the resistor 43 plus (b) that impedance of transistor 26 which in operation appears in series to the impedance of resistor 43.

The following analysis serves to illustrate the statements just made with respect to the suppression of switching transients.

The sum of the above-mentioned impedance of the transistor 20 and the resistance of resistor 41 is designated as $R_1$.

The sum of the above-mentioned input impedance of the transistor 26 and the resistance of resistor 43 is designated as $R_2$.

The resistance of resistor 45 is designated as $R_3$, and the resistance of resistor 46 as $R_4$.

For the suppression of transient switching signals it is necessary that the following equation obtains:

$$\frac{R_1}{R_4}=\frac{R_2}{R_3} \quad (1)$$

whereby $R_1$ through $R_4$ denote the impedance and resistance values just mentioned.

To prove the veracity of the statement made in connection with Equation 1, the following designations are employed:

$i_1$ is the current flowing through $R_1$;
$i_2$ is the current flowing through $R_2$, as well as the collector current of transistor 26, since this transistor is herewith defined for the purpose of the subject analysis as providing practically a common-base current gain of unity;
$i_3$ is the emitter current of transistor 32, as well as its collector current, since the transistor 32 is also defined as providing practically a common-base current gain of unity.

For a fixed input signal level at terminals 10 and 11, small-signal current variations at the junction 40 can be expressed as $$i_3=i_1+i_2 \quad (2)$$

provided the resistor 51 is made sufficiently large so that variations in the current from bias source 50 can be neglected for small-signal calculations.

If the voltage between junction 40 and the common lead 38 is designated as $e_m$, it can be seen that $$i_1=\frac{e_m}{R_1} \quad (3)$$

and $$i_2=\frac{e_m}{R_2} \quad (4)$$

It follows from (3) and (4) that $$\frac{i_1}{i_2}=\frac{R_2}{R_1} \quad (5)$$

so that $$i_1=i_2\frac{R_2}{R_1} \quad (6)$$

combining (2) and (6), we find that $$i_3=i_2\left[1+\frac{R_2}{R_1}\right] \quad (7)$$

When the switching stage 31 is in the process of cutting off the stages 18 and 19, the collector currents $i_2$ and $i_3$ jointly tend to produce a voltage between the output terminals 14 and 15, which is here designated as $e_o$ and can be expressed as $$e_o=i_3R_4-i_2(R_3+R_4) \quad (8)$$

When (7) is implemented into (8), we find that $$e_o=i_2\left[R_4+\frac{R_2R_4}{R_1}-R_3-R_4\right] \quad (9)$$

or $$e_o=i_2\left[\frac{R_2R_4}{R_1}-R_3\right] \quad (10)$$

$e_o$ is zero if $$\frac{R_2R_4}{R_1}=R_3 \quad (11)$$

This can be rewritten as $$\frac{R_1}{R_4}=\frac{R_2}{R_3} \quad (12)$$

This Equation 12 is identical to the above Equation 1 which shows the condition for suppression of switching transients.

Equations 1 and 11 can, of course, also be written as $$\frac{R_1}{R_2}=\frac{R_4}{R_3} \quad (13)$$

or, for example, $$R_1R_3=R_2R_4 \quad (14)$$

Equations 13 and 14 thus illustrate alternative ways in which the conditions for transient signal suppression can be expressed.

In certain applications it will be found that the impedances here of interest of the stages 18 and 19 are primarily determined by the resistances of the resistors 41 and 43, respectively. In this case, Equations 1 and 11 can be rewritten as $$\frac{R_{41}}{R_4}=\frac{R_{43}}{R_3} \quad (15)$$

This then means that a good transient signal suppression is obtained if the ratio of the impedance value of resistor 41 to the impedance value ($R_4$) of resistor 46 is substantially equal to the ratio of the impedance value of the resistor 43 to the impedance value ($R_3$) of resistor 45.

It will be recognized that Equation 15 can be rewritten as $$\frac{R_{41}}{R_{43}}=\frac{R_4}{R_3} \quad (16)$$

or, for example, $$R_{41}R_3=R_{43}R_4 \quad (17)$$

to express alternative ways of signifying transient signal suppression.

In all these examples, the same transient suppression takes place when the switching stage 31 is in the process of permitting the stages 18 and 19 to return to their active signal-processing state.

Substantial transient signal suppression is thus obtained on the basis of ratios of impedance values. This has the significant benefit that corresponding tolerance or performance drifts in the values of the impedances of the resistors and transistors in question do not affect the signal suppression performance, but are self-compensating.

This is an outstanding feature of itself, but has the further advantage that monolithic or integrated circuit devices incorporating the apparatus of FIG. 1 can be manufactured with particular ease, since appropriate tolerances in the impedance-value ratios here considered are permissible, as far as the suppression of transient switching signals is concerned.

Transient signal suppression of the type described above is, of course, also obtained if the impedance represented by the resistor 41 and the impedance represented by the resistor 43 have very low values. In a given application, 41 and 43 need not necessarily be resistors in a conventional sense, but may be wires which interconnect the transistor emitter electrodes 23 and 28 with each other and with the common terminal 40. In other words, the emitter electrodes 23 and 28 may be directly connected to the junction 40. The impedances represented by the resistors 41 and 43 are then equal to the low impedances of the wires connecting emitter electrodes 23 and 28 to the junction 40.

A further advantage of the circuit of FIG. 1 can be recognized if it is considered that the first amplifier stage 18, the second amplifier stage 19, and the switching means or stage 31 each has an electronic device, namely a transistor 23, a transistor 26, and a transistor 32, respectively, and that each of these electronic devices has an electrode of a first type for introducing electric charge carriers, which may be electrons or deficiency carriers or holes, into a region of the electronic device, an electrode of a second type for deriving electric charge carriers from a region of the electronic device, and an electrode of a third type for controlling the flow of electric charge carriers between the electrode of the first type and the electrode of the second type.

According to a further aspect of the invention, the electrode of one of these three types of the electronic device of the first amplifier stage and the electrode of the same type of the electronic device of the switching means or stage are both connected to the input of the second amplifier stage. This manifests itself in the circuit of FIG. 1 as follows:

Both the emitter electrode 23 of the transistor 20 and the emitter electrode 34 of the transistor 32 are connected to the signal input, here resistor 43 and emitter 28, of the transistor 26. Both the first amplifier stage 18 and the switching means or stage 31 operate with respect to the second amplifier stage 19 as emitter followers. Both stages 18 and 31 thus have the high input impedance inherent in emitter follower circuits, which avoids the imposition of a high load on the means (not shown) supplying input signals to terminals 10 and 11 and on the means (not shown) supplying control signals to the terminals 16 and 17.

In accordance with a further aspect of the invention, the electrode of another one of the above-mentioned three types of the electronic device of the second amplifier stage is connected to the output of that second amplifier stage and the electrode of the same type of the electronic device of the switching means or stage is connected to the output of that switching means or stage. This, in turn, manifests itself in the circuit of FIG. 1 as follows:

The collector electrode 29 of the transistor 26 is connected to the series resistors 45 and 46, while the collector electrode 35 of the transistor 32 is connected to one of these series resistors, namely to resistor 46. This facilitates the achievement of equal signal gains from the first and second stages 18 and 19 and from the switching stage 31 while the transistors 20 and 26 are being cut off in response to a control signal at terminals 16 and 17, and aids in the suppression of spurious switching transients during various phases of the cut-off process.

It will be recognized that the stages 18 and 19 are non-inverting amplifier stages. This is of particular advantage in certain applications, such as in the processing of video signals, where a phase inversion of the processed signals would be disadvantageous. The switching stage 31 is non-inverting with respect to the junction 40 but inverting with respect to the output resistor 46, which promotes the suppression of switching transients. In addition, the apparatus of FIG. 1 has an output impedance which is substantially equal to the resistors 45 and 46 and is thus practically fixed due to the relatively high collector impedances of the transistors 26 and 32. This may be of considerable significance in a given application, particularly in situations where the output of the apparatus is connected to a filter circuit requiring a fixed source impedance. Moreover, the signal voltage gain of the apparatus of FIG. 1 is largely determined by impedance values, especially if resistors 41 and 43 are relatively large compared to associated transistor impedances.

A further feature of the embodiment of FIG. 1 is the simplicity of the circuit coupling and biasing the first and second amplifier stages 18 and 19 and the switching stage 31. This coupling and biasing circuit includes a simple T-type network having a first leg including the resistor 41 connected to the transistor emitter 23, a second leg including the resistor 43 connected to the transistor emitter 28, a junction between these first and second legs including the terminal 40 connected to the transistor emitter 34, and a third leg including the resistor 51 for connecting the source 50 to the junction 40. Simple circuits of this type are particularly suitable to implementation in monolithic or integrated circuit devices.

Many different types of transistors are suited to the use in the circuit of FIG. 1. The dimensioning of the various resistors may also be subject to wide variations. This depends on various factors, including the purpose for which the circuit is intended. However, the following broad outline is here given for convenience by way of example.

The transistors 20, 26 and 32 are of the type 2N3694.

Sources 37 and 50 and the variable source 42 are 12 volt sources.

Resistors 41 and 43 each have a resistance value of 100 ohms, and resistors 45 and 46 each have a resistance value of 1,200 ohms. The resistor 51 has a value of 1,000 ohms.

The control signals applied at terminals 16 and 17 preferably are signals alternating between negative and positive values. Each control signal may be a switching pulse rising from, say, minus two volts to, say, plus two volts.

The apparatus of FIG. 1 is particularly suitable to switch signals extending into the high-frequency range. As an example, a video signal may be mentioned. In switching video signals it is particularly important that no objectionable switching transients be introduced into the switched signals, since the circuits which are responsive to these signals are by their nature sensitive to spurious signal spikes or pulses, since they are designed to respond to synchronization signal pulses. In addition, the circuits which process video signals are particularly sensitive to deviating signal levels, since the display of video signals on the video picture tube is controlled in accordance with varying signal voltage levels.

The requirements as to switching performance are thus very high, inasmuch as each signal for a horizontal line of video information not only varies widely through various intermediate values between two voltage levels resulting, respectively, in an extreme white and an extreme black picture display, but also contains synchronization information, such as the extremely short horizontal synchronization pulse, extending from the so-called pedestal black or blanking level to the extreme synchronization black or sync-peak level to which the synchronization circuit of the video receiver is responsive and which serves as a voltage reference.

The apparatus of FIG. 1 not only switches such signals extremely accurately and with a minimum of transients, but is capable of providing during the signal cut-off periods an auxiliary signal of predetermined magnitude which appears at the output terminals 14 and 15 of this apparatus in substitution of the signal processed by the stages 18 and 19.

In the apparatus of FIG. 1, this auxiliary or substitute signal is provided by action of the transistor 31 on the common output resistor 46 in response to a control signal at control input terminals 16 and 17. In one manner of operation, the components of the switching stage 31, the common output resistor 46 and the control signals active at terminals 16 and 17 are dimensioned such that the mentioned auxiliary signal has a level which corresponds to the above-mentioned pedestal black or blanking level, so that neither the picture tube nor the synchronization circuits are adversely affected by this auxiliary signal. In brief, the switching stage 31 can be made to provide automatic blanking of the video display during cut-off of the amplifier stages 18 and 19, although it is possible to have the switching stage 31 provide defined voltage levels other than those resulting in blanking of the video display, if desired.

Figure 2:
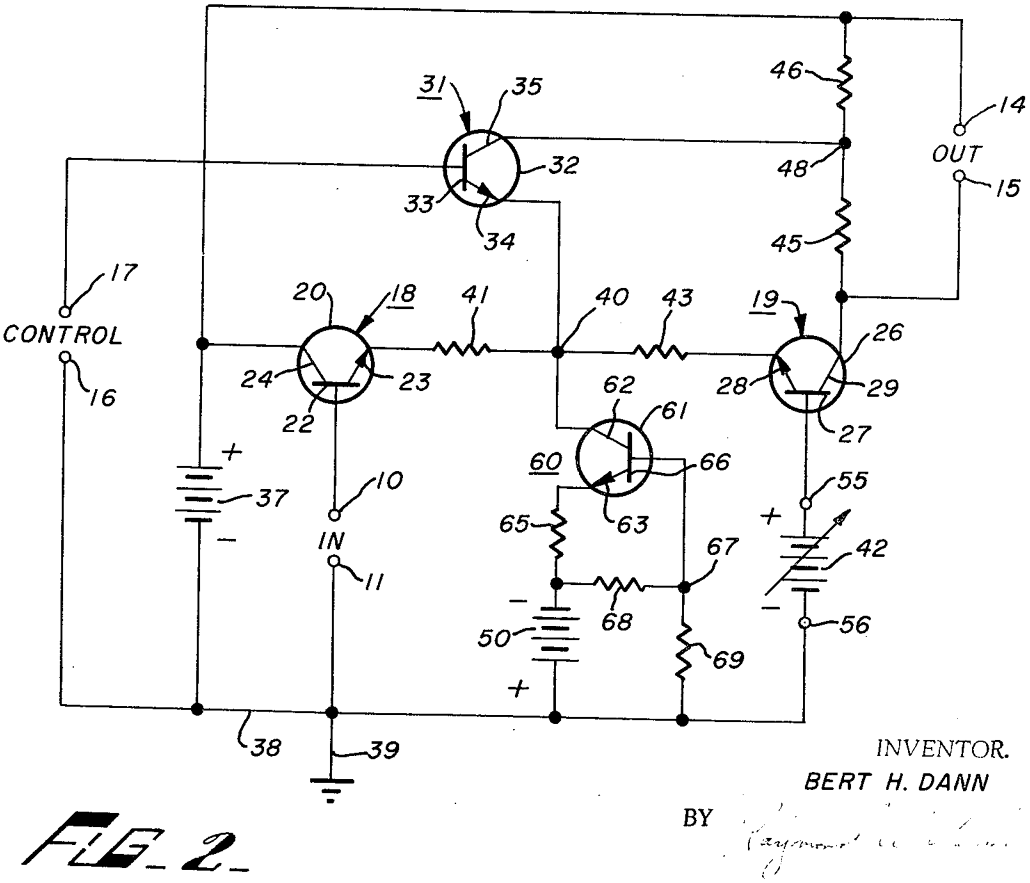
FIG. 2 is a diagram of a switching or gating apparatus similar to that shown in FIG. 1 and modified in accordance with a further preferred embodiment of the invention.

FIG. 2 shows a modification of the apparatus illustrated in FIG. 1. Like parts as among FIGS. 1 and 2 are, therefore, designated by like reference numerals and the above description of FIG. 1 should be consulted as to the nature and operation of these like parts.

The modification effected in FIG. 2 concerns the replacement of the resistor 51 shown in FIG. 1 by a source 60 of substantially constant electric current, which may also be termed a regulated-current source. This constant-current source includes a transistor 61 having a collector electrode 62 connected to the above-mentioned common junction 40 and having an emitter electrode 63 connected through a resistor 65 to the negative terminal of the above-mentioned bias source 50. The transistor 61 further includes a base electrode 66 connected to a junction 67 between a pair of voltage-divider resistors 68 and 69 which are connected in series-circuit relationship between the negative terminal of source 50 and the common ground lead 38.

The circuit just described maintains the total current at the junction 40 at a substantially constant level. It will be recalled in this connection that the total current at terminal 40 includes the emitter current of transistor 20 flowing through the resistor 41, the emitter current of transistor 26 flowing through the resistor 43 and the emitter current of transistor 32.

In the embodiment of FIG. 2, the constant-current source 60 serves as the source of electric charge carriers for the transistor emitters 23, 28 and 34.

The source 60 stabilizes the operation of the apparatus of FIG. 2 as against fluctuations in the magnitude of the control signals applied at terminals 16 and 17 and also permits these control signals to be larger than would otherwise be satisfactorily feasible, particularly in the "off" direction. This has the advantage that the control signal intended for application to the terminals 16 and 17 need not necessarily be processed through elaborate stabilizing means. Moreover, the source 60, by maintaining the total current at junction 40 at a substantially constant level, stabilizes the level of the above-mentioned substitute signal and improves the suppression of switching transients. This is apparent from the above Equation 2 where the assumption was made that the current at junction 40 from the bias source 50 be substantially constant.

It will now be recognized that the apparatus of FIG. 2 may, for example, be viewed as a means for processing first electric signals between (a) terminals 10 and 11 and (b) terminals 14 and 15, and second electric signals between (c) and terminals 16 and 17 and (d) the latter terminals 14 and 15. This view may also be taken of the apparatus shown in FIG. 1, except that the control signal applied to that apparatus should preferably be of a stabilized nature.

Figure 3:
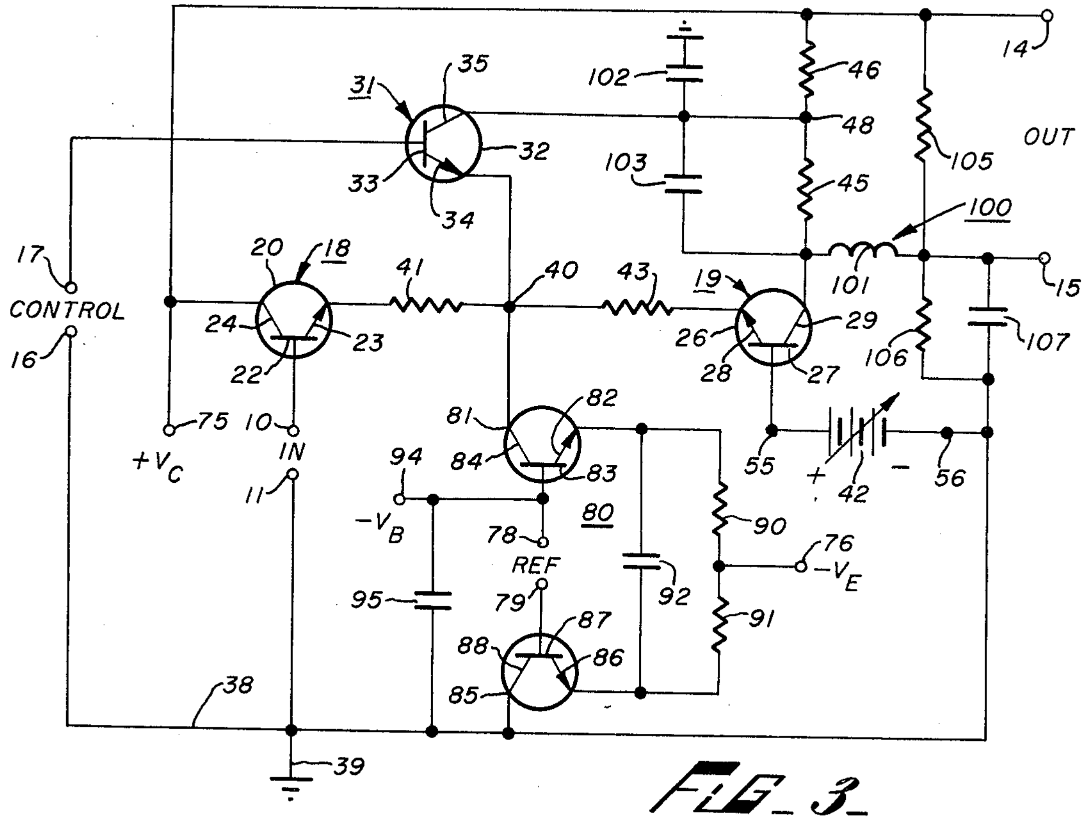
FIG. 3 is a diagram of a switched or gated demodulator which conforms to a further preferred embodiment of the invention and which may be adapted for use as a modulator.

FIG. 3 diagrammatically illustrates a switched signal detector or product demodulator which is, for example, useful as a means for recovering, at selectively switched intervals, an information signal from a modulated wave.

The general theory and function of product demodulators are well known. Reference may, for example, be had in this connection to Black, Modulation Theory (Van Nostrand—1953) pp. 157 et seq.

Since the apparatus of FIG. 3 can, in a sense, be viewed as a modification of the apparatus according to FIG. 1 or FIG. 2, like reference numerals are employed for like parts and reference is made to the foregoing description of these like parts and of their function.

To simplify the schematic diagram of FIG. 3, the source 37 of FIGS. 1 and 2 is in FIG. 3 indicated by the potential $+V_C$ applied to the terminal 75, while the source 50 of FIGS. 1 and 2 is in FIG. 3 indicated by the potential $-V_E$ applied to the terminal 76.

A modulated wave composed of a carrier signal and at least one information signal to be recovered, is applied to the input terminals 10 and 11 of the apparatus shown in FIG. 3. A reference or demodulation signal corresponding to the carrier signal just mentioned is applied to the terminals 78 and 79 of a push-pull clipper circuit 80 connected between the common lead 38 and the common terminal 40.

The clipper circuit 80 includes a first transistor 81 having an emitter electrode 82, a base electrode 83 and a collector electrode 84, and a second transistor 85 having an emitter electrode 86, a base electrode 87 and a collector electrode 88. The collector electrode 84 is connected to the common junction 40, and the collector electrode 88 is connected to the common lead 38.

The emitter electrode 82 is connected to the bias potential terminal 76 through a resistor 90, while a resistor 91 connects the emitter electrode 86 to that terminal 76. The emitter electrodes 82 and 86 are also interconnected by a bypass capacitor 92.

A base bias potential $-V_B$, which may be about one-half the magnitude of the potential $-V_E$, is applied to a terminal 94 and from there to the terminal 78. A bypass capacitor 95 is connected between terminal 78 and common lead 38 as shown.

The clipper circuit 80 is operated to provide at terminal 40 a demodulation signal composed of a series of current pulses each of which has an approximate length of $\pi/\omega$; wherein $\omega$ is the angular frequency of the reference signal applied at terminals 78 and 79.

In a prototype circuit designed for the switched demodulation of color video signal components, two transistors of the type 2N3694 were used as the clipper transistors 81 and 85. $-V_E$ was —12 volts and $-V_B$ was about —6.1 volts. The resistors 90 and 91 each had a value of about 1,000 ohms, and the capacitor 92 had a value of .01 microfarad, while the capacitor 95 had a value of .03 microfarad. These values are, of course, only of an illustrative nature.

The demodulation signals provided by clipper circuit 80 and applied to the amplifier stages 18 and 19 through the common junction 40 are combined with the modulated wave applied at input terminals 10 and 11 and processed by the stages 18 and 19. The product of such combination appears at output resistors 45 and 46. The higher frequency components in such product are rejected by the low-pass filter circuit 100 located ahead of the output terminals 14 and 15 as shown. This filter circuit is designed to pass the demodulated signal or, in other words, the recovered information signal.

The filter circuit 100 illustrated in FIG. 3 is composed of an inductance 101 connected between the collector electrode 29 of transistor 26 and output terminal 15, a pair of filter input capacitors 102 and 103 connected, respectively, between the resistor junction 48 and ground and between this junction 48 and the collector electrode 29, a pair of filter termination resistors 105 and 106 connected, respectively, between the terminals 14 and 15 and between the terminal 15 and the common lead 38, and a capacitor 107 connected across the resistor 106.

While only illustrative data can be given as to the values of these components, it may be helpful to mention that in a prototype circuit designed to have a cutoff frequency of about 700 kilocycles per second, the values of the components just discussed were chosen to be approximately as follows:

Inductance 101=1,100 micro-henry;
Capacitors 102 and 103=180 picofarad each;
Resistors 105 and 106=4,700 ohms each; and
Capacitor 107=90 picofarad.

In the demodulation of electrical signals it is frequently desirable to interrupt the demodulation process for given periods of time. The circuit of FIG. 3 is designed to permit this type of operation, thereby keeping transient switching signals at a minimum. For this purpose, the circuit of FIG. 3 employs the switching stage 31 which has already been described in connection with FIGS. 1 and 2.

Upon the application of a control signal at terminals 16 and 17, the transistor 32 of the switching stage 31 cuts off the operation of the amplifier stages 18 and 19 by virtue of the connection of its emitter electrode 34 to the common junction 40. In other words, the switching stage 31 switches the stages 18 and 19 to a signal blocking state. In brief, when the transistor 32 becomes conductive, the reference pulses supplied at terminal 40 by the clipper circuit 80 are primarily taken up by the transistor 32 and become thus insufficient to keep the transistors 20 and 26 operative. In a sense, this can be viewed as the supply of a cut-off signal by the switching stage 31 to the amplifier stages 18 and 19. It may also be viewed as the performance of a current variation operation at junction 40 which is effective to switch the stages 18 and 19 from one mode or state of operation to another.

At the same time, switching transients are suppressed in the manner already described in connection with FIG. 1.

While the stages 18 and 19 are being maintained in their cut-off state, the switching stage 31, through the collector electrode 35, supplies a signal which acts through output resistor 46 and appears at the output terminals 14 and 15 in substitution of the demodulated signal otherwise processed by the stage 19. There is thus again a provision of a substitute signal by the switching stage in the general manner described above. In the illustrated embodiment, the substitute output signal is of direct-current component, since the alternating current components of the reference current pulses are rejected by the low-pass filter 100.

In many applications it is desirable that the substitute signal provided by the switching stage, here stage 31, have a predetermined value that is corelated to a given level of the demodulated signal. For instance, in the switched demodulation of chroma signals there are situations where it is desirable that the output terminals, here terminals 14 and 15, be at a level corresponding to that existing when there is no chroma input signal while the demodulation process is temporarily switched off. Of course, one is free to choose other desired quiescent output levels.

The apparatus of FIG. 3 thus permits a switched demodulation of signals and yields the same basic inherent advantages as the apparatus of FIGS. 1 and 2.

Figure 4:
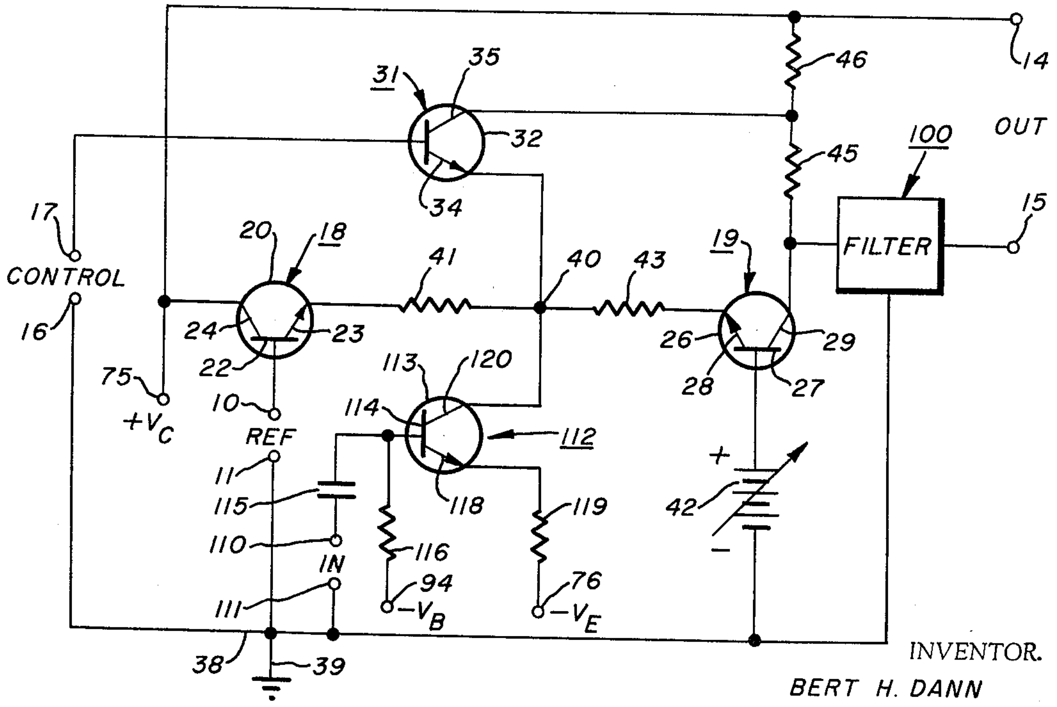
FIG. 4 is a diagram of a switched or gated demodulator which conforms to a further preferred embodiment of the invention and which may be adapted for use as a modulator.

The apparatus diagrammaticaly illustrated in FIG. 4 is also a switched demodulator. Since this apparatus bears a significant similarity to the apparatus shown in FIG. 3, like reference numerals are employed for like parts.

In the apparatus of FIG. 4, the previously described reference or demodulation signal is applied to the input terminals 10 and 11 of the amplifier stage 18 to be processed by that stage. The wave to be demodulated is applied to the input terminals 110 and 111 of an amplifier stage 112 which has a transistor 113. This transistor 113 has a base electrode 114 connected to input terminal 110 through a direct-current blocking capacitor 115. The other input terminal 111 is connected to the common lead 38, and a resistor 116 connects the base bias potential—$V_B$ from the terminal 94 to the base electrode 114.

The transistor 113 further has an emitter electrode 118 which is connected by a resistor 119 to the terminal 76 and thus to the emitter bias potential $-V_E$. The transistor 113 moreover has a collector electrode 120 which is connected to the common junction 40 to apply the modulated signal processed by stage 112 thereto.

The modulated signal is combined with the reference or demodulation signal in the amplifier stage 19 and the product appears at output resistors 45 and 46. The low-pass filter 100, which may include the same filter circuit as the one shown in FIG. 3, and which is illustrated in FIG. 4 in simplified block form, passes the demodulated signal to the output terminals 14 and 15.

The action of the switching stage 31 again serves to interrupt the demodulation process of the apparatus of FIG. 4 in response to a control signal applied at terminals 16 and 17. In brief, when the switching transistor 32 is rendered conducting by a control signal applied at terminals 16 and 17, the signals from stage 112 are mainly taken up by this transistor 32, and the stages 18 and 19 become cut off.

A suppression of switching transients and provision of substitute signals takes place in the apparatus of FIG. 4 in the same general manner as in the apparatus of FIGS. 1, 2 or 3, as will be appreciated from the similarity of circuit components and circuit connections.

If the general circuitry of FIG. 4 is compared to that of FIG. 3, it will be appreciated that a switched demodulation function can also be realized by the apparatus of FIG. 4 if the signal to be demodulated is applied to the input terminals 10 and 11 of the amplifier stage 18, while the reference or demodulating signal is applied to the terminals 110 and 111. In this case, the stage 112 is preferably operated as a clipper in a manner known per se from the general operation of clipper circuits, so as to provide at the common terminal 40 a series of demodulation pulses of hte above-mentioned length of $\pi/\omega$, whereby $\omega$ is again the angular frequency of the reference or demodulating signal.

If desired, the apparatus of FIG. 4 may be operated as a switched modulator in which the carrier signal is applied to the terminals 10 and 11, or to the terminals 110 and 111, while the signal with which the carrier is to be modulated is applied to the terminals 110 and 111, or to the terminals 10 and 11, as the case may be. This possibility is available in view of the fact that demodulator circuits of the subject type can generally be operated as modulators. It will be noted that such a modulator function is also inherent in the apparatus of FIG. 3.

If the apparatus of FIG. 3 or the apparatus of FIG. 4 is operated as a modulator, it is necessary that the filter 100 be a high-pass or band-pass filter, rather than a low pass, filter, so that the modulation product, rather than the carrier or the information signal appears at the terminals 14 and 15.

Figure 5:
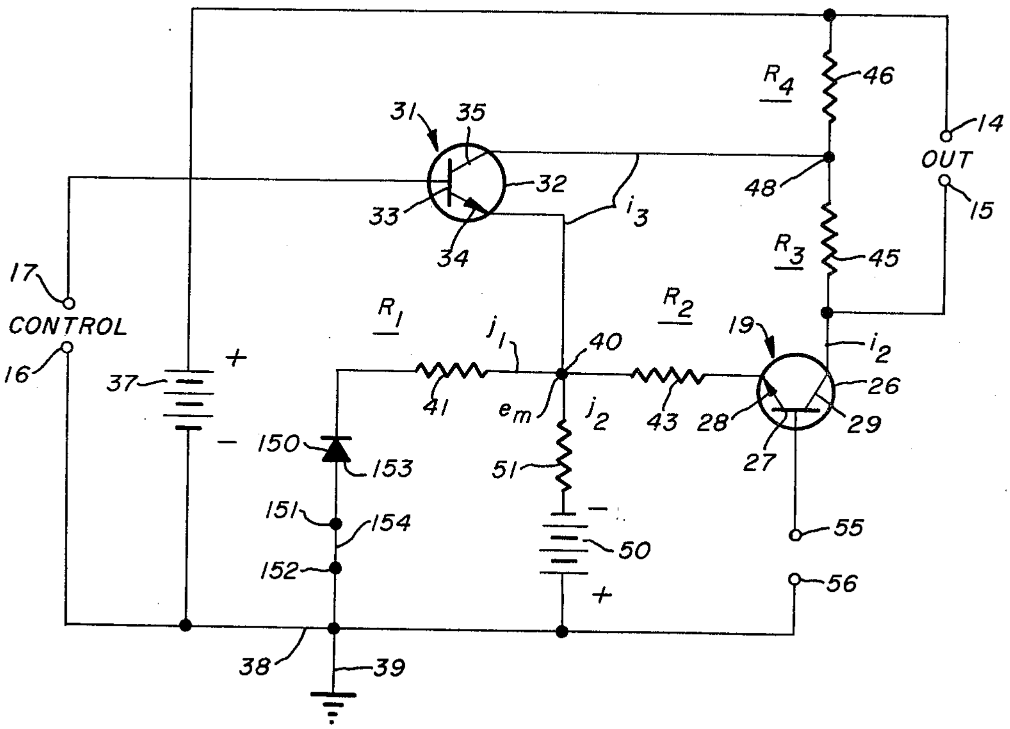
FIG. 5 is a diagram of a switching or gating apparatus in accordance with yet another preferred embodiment of the invention.

FIG. 5 shows a switching or gating apparatus that is similar to the apparatus in FIG. 1, but embodies a modification.

In FIG. 5, a non-linear current-conducting device or diode 150 is employed in lieu of the transistor stage 18. The diode 150 is connected between the common lead 38 and the resistor 41 as shown, so that the diode 150 is biased in forward direction by the source 50. As an example, a germanium diode or a silicon diode, such as a silicon signal diode type T19, can be used as the diode 150.

The previously described terminals 55 and 56 are used as the signal input terminals in the apparatus of FIG. 5. As far as the other components and circuits of the apparatus of FIG. 5 and their functions are concerned, reference should be had to the above description of FIG. 1.

A signal applied to input terminals 55 and 56 is amplified in the stage 19 and occurs in resistors 45 and 46 and at output terminals 14 and 15. Since the diode 150 is forward biased as shown, its forward resistance is comparable to the common-base input impedance of the transistor 20 shown in FIG. 1, under the previously described condition in which the terminals 55 and 56 were used as signal input means.

When the switching stage 31 is activated by a control signal at terminals 16 and 17, it derives, through its emitter electrode 34, current from the junction 40 in a sense so that the stage 19 is cut off and the diode 150 is biased to have a high impedance. From this point of view, the diode 150 can be regarded as a variable impedance device having generally a first mode of operation with a low first impedance and a second mode of operation with a high second impedance. The gating circuit of stage 31, namely the circuit including emitter electrode 34 and the connection thereof to junction 40, is effective to switch the diode 150 from its first to its second mode of operation in response to a control signal at terminals 16 and 17.

Simultaneously, the stage 19 is switched from a first state in which signals received at terminals 55 and 56 are processed and applied to output terminals 14 and 15, to a second state in which such processing of input signals is suspended, until the switching stage 31 is rendered inactive by a change in the control signal at terminals 16 and 17, As the similarity of the circuits of FIGS. 1 and 5 indicates, the apparatus of FIG. 5 provides for a suspression of switching transients in the manner described above, if the impedance relationships involving $R_1$ through $R_4$ are as previously described.

In addition, the switching stage 31 in FIG. 5 provides the substitute signal described in connection with FIG. 1.

The apparatus of FIG. 5 thus provides several of the previously described advantages and benefits.

It has been found that input signals to be processed and switched or gated may also be applied to the diode 150 of the apparatus of FIG. 5. For this purpose, terminals 151 and 152 may be inserted as shown between the anode 153 and the diode 150 and the common lead 38. The illustrated lead portion 154 is then removed from between the terminals 151 and 152 and an input signal, preferably from a low-impedance source (not shown) is applied to these terminals 151 and 152.

At the same time, the terminals 55 and 56 may be shorted, so that only the latter input signal is processed through the diode 150 and in the stage 19.

Alternatively, a first input signal may be applied to the terminals 151 and 152 and a second input signal to the then unshorted terminals 55 and 56. The first and second input signals are then combined, such as added, during processing in the apparatus of FIG. 5.

If desired, the constant current source 60 shown in FIG. 2 may be incorporated into the apparatus of FIG. 5 between the common lead 38 and the junction 40, to provide the advantages described in connection with FIG. 2.

Alternatively, the push-pull clipper circuitry 80 illustrated in FIG. 3, or the amplifier stage 112 illustrated in FIG. 4, may be connected between common lead 38 and junction 40 of the apparatus of FIG. 5, and varying reference or carrier signals may be applied to obtain analogous modulating or demodulating functions with the apparatus of FIG. 5, as will be apparent to those skilled in the art.

It will now be recognized that the circuits disclosed herein are very versatile in their application. To illustrate a further application, the use of the circuit of FIG. 2 as a phase detector is herewith disclosed.

To facilitate the understanding of this aspect of the subject invention, reference is made to Fink, Television Engineering Handbook (McGraw-Hill 1957), hereinafter referred to as Fink. On p. 16–136 et seq. Fink describes an automatic phase control which comprises a phase-actuated servo system composed of three functional units, which include a phase detector, a low-pass filter, and a direct-current controlled oscillator as illustrated by Fink in his Fig. 16–146. The low-pass filter is connected between the output of the phase detector and the input of the controlled oscillator.

The phase detector has a first input for receiving synchronization signals and a second input for receiving feedback signals from the controlled oscillator, and produces an output signal which is indicative of the relative phase difference between the signals received at the first input and the signals received at the second input.

In accordance with a preferred embodiment of the currently discussed aspect of the subject invention, the terminals 10 and 11 of the circuit shown in FIG. 2 of the accompanying drawings are shorted so that the base electrode 22 of the transistor 18 is connected to the grounded common lead 38. The synchronization signals are applied to the control terminals 16 and 17, which serve as a first input means, while the feedback signals from the controlled oscillator are applied to the terminals 55 and 56, which serve as a second input means of the circuit of FIG. 2. The variable source 42 is removed, and the phase difference signal is derived from the output terminals 14 and 15.

If the embodiment of FIG. 2 is operated in this fashion, the stages 18 and 19 operate as a differential signal processing means having input terminals 55 and 56 for receiving an external input signal. The stage 31 switches the stages 18 and 19 in accordance with the external input signals applied at terminals 16 and 17 in the manner described above. If desired or necessary, the differential stages 18 and 19 may be balanced by inserting an impedance between the terminals 10 and 11 which matches an impedance in the circuit (not shown) connected to the input terminals 55 and 56.

If the circuit of FIG. 2 operates as a phase detector, the switching stage 31 may again be made to provide the above-described substitute signal in the intervals between synchronization pulses. For example, the resistances 45 and 46 may be of equal value, so that the effective output of the phase detector has a level equal to zero phase error when there is no synchronization pulse at the terminals 16 and 17.

The values of the resistors 41 and 43 may be such that the collector current of the stage 19 is linearly related to the instantaneous magnitude of the input signal at terminals 55 and 56. If this input signal is present in the form of a square wave, the resistors 41 and 43 may be deleted and the emitter electrodes 23 and 28 connected directly to the junction 40 to provide for maximum gain.

Other advantages of the circuit of FIG. 2 when operated as a phase detector are easily seen from the above description of FIGS. 1 and 2.

While specific circuits have been described and shown herein for the purpose of illustration, those skilled in the art will recognize that many modifications thereof and the realization of various further embodiments are possible within the scope of the subject invention and its various aspects.

What I claim is:

1. Apparatus for processing and switching electric signals, comprising:
- (a) means for processing electric signals;
- (b) switching means including a switching circuit connected to said processing means for selectively suspending the processing of said electric signals;
- (c) said switching means further including an output circuit for providing, when the processing of said electric signals is suspended, a substitute signal for the signals processed by said processing means; and
- (d) means for applying a varying reference signal to said processing means for causing a demodulation of signals processed in said processing means.

2. Apparatus for processing and switching electric signals, comprising:
- (a) means for processing electric signals;
- (b) switching means including a switching circuit connected to said processing means for selectively suspending the processing of said electric signals;
- (c) said switching means further including an output circuit for providing, when the processing of said electric signals is suspended, a substitute signal for the signals processed by said processing means; and
- (d) means for applying a carrier signal to said processing means for causing said processing means to provide a carrier signal modulated by signals processed in said processing means.

3. Apparatus for processing and switching electric signals, comprising:
- (a) at least two processing stages for processing electric signals;
- (b) means for interconnecting said processing stages to conduct processed signals from one stage to the next, with said processing stages being constructed to selectively suspend the processing of said electric signals in response to switching signals applied to said interconnecting means; and (c) switching means connected to said interconnecting means for applying said switching signals; wherein
(d) said interconnecting means include first impedance means connected to a first one of said processing stages and second impedance means connected to said first impedance means and to a second one of said processing stages;
(e) said processing stages include an output circuit including third and fourth impedance means; and
(f) said switching means include an output circuit including said fourth impedance means, and a switching circuit connected to a junction between said first and second impedance means for applying said switching signals.

4. Apparatus as claimed in claim 3, wherein
(a) the ratio of
(1) the impedance of said first impedance means plus an impedance of said first stage in series with the impedance of said first impedance means, to
(2) the impedance of said fourth impedance means,
(b) is substantially equal to
(c) the ratio of
(1) the impedance of said second impedance means plus an impedance of said second stage in series with the impedance of said second impedance means, to
(2) the impedance of said third impedance means.

5. Apparatus as claimed in claim 3, wherein one of said processing stages includes an emitter-follower amplifier circuit connected by said interconnecting means to another of said processing stages.

6. Apparatus as claimed in claim 5, wherein said other of said processing stages includes a transistor having an emitter electrode connected to said interconnecting means.

7. Apparatus as claimed in claim 5, wherein said switching means include a transistor having an emitter electrode connected to said interconnecting means.

8. Apparatus as claimed in claim 3, including means for applying a varying reference signal to said processing stages for causing a demodulation of signals processed in said processing stages.

9. Apparatus as claimed in claim 3, including means for applying a carrier signal to said processing stages to provide a carrier signal modulated by signals processed in said processing means.

10. Apparatus as claimed in claim 8, wherein said switching means are constructed to provide at said output circuit of said switching means when the processing of electric signals by said processing stages is suspended, a substitute signal for the signals processed by said processing stages.

11. Apparatus as claimed in claim 9, wherein said switching means are constructed to provide at said output circuit of said switching means, when the processing of electric signals by said processing means is suspended, a substitute signal for the signals processed by said processing means.

12. Apparatus as claimed in claim 4, including means for applying a varying reference signal to said processing stages for causing a demodulation of signals processed in said processing stages.

13. Apparatus as claimed in claim 4, including means for applying a carrier signal to said processing stages to provide a carrier signal modulated by signals processed in said processing means.

14. Apparatus as claimed in claim 12, wherein said switching means are constructed to provide at said output circuit of said switching means, when the processing of electric signals by said processing means is suspended, a substitute signal for the signals processed by said processing means.

15. Apparatus as claimed in claim 13, wherein said switching means are constructed to provide at said output circuit of said switching means, when the processing of electric signals by said processing means is suspended, a substitute signal for the signals processed by said processing means.

16. Apparatus for processing and switching electric signals, comprising:
(a) means for processing electric signals;
(b) variable impedance means;
(c) means for interconnecting said processing means and said variable impedance means, and for receiving switching signals, with said processing means being constructed to selectively suspend the processing of said electric signals in response to said switching signals, and said variable impedance means having an impedance variable in response to said switching signals; and
(d) switching means connected to said interconnecting means for applying said switching signals; wherein
(e) said interconnecting means include first impedance means connected to said variable impedance means and second impedance means connected to said processing means;
(f) said processing means include an output circuit including third and fourth impedance means; and
(g) said switching means include an output circuit including said fourth impedance means, and a switching circuit connected to a junction between said first and second impedance means for applying said switching signals.

17. Apparatus as claimed in claim 16, wherein
(a) the ratio of
(1) the impedance of said first impedance means plus an impedance value of said variable impedance means, to
(2) the impedance of said fourth impedance means,
(b) is substantially equal to
(c) the ratio of
(1) the impedance of said second impedance means plus an impedance of said processing means in series with the impedance of said second impedance means, to
(2) the impedance of said third impedance means.

18. Apparatus as claimed in claim 16, including means for stabilizing the flow of electric current through a predetermined point of said interconnecting means.

19. Apparatus as claimed in claim 18, wherein said stabilizing means include a source of substantially constant electric current connected to said interconnecting means.

20. Apparatus as claimed in claim 16, wherein said switching means are constructed to provide at said output circuit of said switching means, when the processing of electric signals by said processing means is suspended, a substitute signal for the signals processed by said processing means.

21. Apparatus as claimed in claim 16, including means for applying a varying reference signal to said processing means for causing a demodulation of signals processed in said processing means.

22. Apparatus as claimed in claim 16, including means for applying a carrier signal to said processing means to provide a carrier signal modulated by signals processed in said processing means.

23. Apparatus as claimed in claim 21, wherein said switching means are constructed to provide at said output circuit of said switching means, when the processing of electric signals by said processing means is suspended, a substitute signal for the signals processed by said processing means.

24. Apparatus as claimed in claim 22, wherein said switching means are constructed to provide at said output circuit of said switching means, when the processing of electric signals by said processing means is suspended, a substitute signal for the signals processed by said processing means.

25. Apparatus as claimed in claim 17, including means for applying a varying reference signal to said processing means for causing a demodulation of signals processed in said processing means.

26. Apparatus as claimed in claim 17, including means for applying a carrier signal to said processing means to provide a carrier signal modulated by signals processed in said processing means.

27. Apparatus as claimed in claim 25, wherein said switching means are constructed to provide at said output circuit of said switching means, when the processing of electric signals by said processing means is suspended, a substitute signal for the signals processed by said processing means.

28. Apparatus as claimed in claim 26, wherein said switching means are constructed to provide at said output circuit of said switching means, when the processing of electric signals by said processing means is suspended, a substitute signal for the signals processed by said processing means.

29. Apparatus as claimed in claim 16, wherein said variable impedance means include a non-linear impedance device.

30. Apparatus as claimed in claim 16, wherein said variable impedance means include a diode.

31. Apparatus for processing and switching electric signals, comprising:

(a) at least two processing stages for processing electric signals;
(b) means for interconnecting said processing stages to conduct processed signals from one stage to the next, with said processing stages being constructed to selectively suspend the processing of said electric signals in response to switching signals applied to said interconnecting means;
(c) switching means connected to said interconnecting means for applying said switching signals; and
(d) means for applying a varying reference signal to said processing stages for causing a demodulation of signals processed in said processing stages.

32. Apparatus as claimed in claim 31, wherein said switching means have an output circuit for providing, when the processing of electric signals by said processing stages is suspended, a substitute signal for the signals processed by said processing stages.

33. Apparatus for processing and switching electric signals, comprising:

(a) at least two processing stages for processing electric signals;
(b) means for interconnecting said processing stages to conduct processed signals from one stage to the next, with said processing stages being constructed to selectively suspend the processing of said electric signals in response to switching signals applied to said interconnecting means;
(c) switching means connected to said interconecting means for applying said switching signals; and
(d) means for applying a carrier signal to said processing stages to provide a carrier signal modulated by signals processed in said processing means.

34. Apparatus as claimed in claim 33, wherein said switching means have an output circuit for providing, when the processing of electric signals by said processing stages is suspended, a substitute signal for the signals processed by said processing stages.

35. Apparatus for processing and switching electric signals, comprising:

(a) means for processing electric signals;
(b) variable impedance means;
(c) means for interconnecting said processing means and said variable impedance means, and for receiving switching signals, with said processing means being constructed to selectively suspend the processing of said electric signals in response to said switching signals, and said variable impedance means having an impedance variable in response to said switching signals;
(d) switching means connected to said interconnecting means for applying said switching signals; and
(e) means for applying a varying reference signal to said processing means for causing a demodulation of signals processed in said processing means.

36. Apparatus as claimed in claim 35, wherein said switching means have an output circuit for providing, when the processing of electric signals by said processing means is suspended, a substitute signal for the signals processed by said processing means.

37. Apparatus for processing and switching electric signals, comprising:

(a) means for processing electric signals;
(b) variable impedance means;
(c) means for interconnecting said processing means and said variable impedance means, and for receiving switching signals, with said processing means being constructed to selectively suspend the processing of said electric signals in response to said switching signals, and said variable impedance means having an impedance variable in response to said switching signals;
(d) switching means connected to said interconnecting means for applying said switching signals; and
(e) means for applying a carrier signal to said processing means to provide a carrier signal modulated by signals processed in said processing means.

38. Apparatus as claimed in claim 37, wherein said switching means have an output circuit for providing, when the processing of electric signals by said processing means is suspended, a substitute signal for the signals processed by said processing means.

References Cited

UNITED STATES PATENTS

| | | | |
|---|---|---|---|
| 2,535,912 | 12/1950 | Frank et al. | 328—99 XR |
| 2,570,225 | 10/1951 | Felker | 328—99 |
| 2,657,318 | 10/1953 | Rack | 307—243 |
| 3,123,721 | 3/1964 | Kaufman | 307—235 XR |
| 3,171,044 | 2/1965 | Coffey | 307—254 XR |
| 3,315,089 | 4/1967 | Mayne | 330—30 XR |
| 3,437,843 | 4/1969 | Phillips | 307—254 |

JOHN S. HEYMAN, Primary Examiner

J. ZAZWORSKY, Assistant Examiner

U.S. Cl. X.R.

328—99; 329—101; 330—30; 332—31